United States Patent
Brennecke et al.

(10) Patent No.: US 6,708,952 B2
(45) Date of Patent: Mar. 23, 2004

(54) VALVE SEAT

(75) Inventors: Craig F. Brennecke, Hollidaysburg, PA (US); Donald A. Mills, Tyrone, PA (US)

(73) Assignee: McLanahan Corporation, Hollidaysburg, PA (US)

( * ) Notice: Subject to any disclaimer, the term of this patent is extended or adjusted under 35 U.S.C. 154(b) by 0 days.

(21) Appl. No.: 10/388,866

(22) Filed: Mar. 14, 2003

(65) Prior Publication Data

US 2003/0173538 A1 Sep. 18, 2003

Related U.S. Application Data

(60) Provisional application No. 60/364,698, filed on Mar. 15, 2002.

(51) Int. Cl.[7] ................................................. F16K 1/42
(52) U.S. Cl. ........................................ 251/363; 251/359
(58) Field of Search ................................. 251/359–365

(56) References Cited

U.S. PATENT DOCUMENTS

| | | | | |
|---|---|---|---|---|
| 3,885,771 A | * | 5/1975 | Baumann | 251/360 |
| 4,247,080 A | * | 1/1981 | Morrison | 251/359 |
| 4,470,430 A | * | 9/1984 | Lancaster | 251/360 |
| 4,830,281 A | * | 5/1989 | Calder | 251/362 |
| 5,294,092 A | * | 3/1994 | Wade et al. | 251/361 |
| 6,152,423 A | * | 11/2000 | Nichols | 251/360 |

* cited by examiner

*Primary Examiner*—Paul J. Hirsch
(74) *Attorney, Agent, or Firm*—Webb Ziesenheim Logsdon Orkin & Hanson, P.C.

(57) ABSTRACT

A method and apparatus for attaching a valve to another device such as a device, such as a device for separating a solid from a liquid. A valve seat according to the present invention is friction fitted into an orifice defined by the device and a conduit is attached to the valve seat via a removable spline.

20 Claims, 3 Drawing Sheets

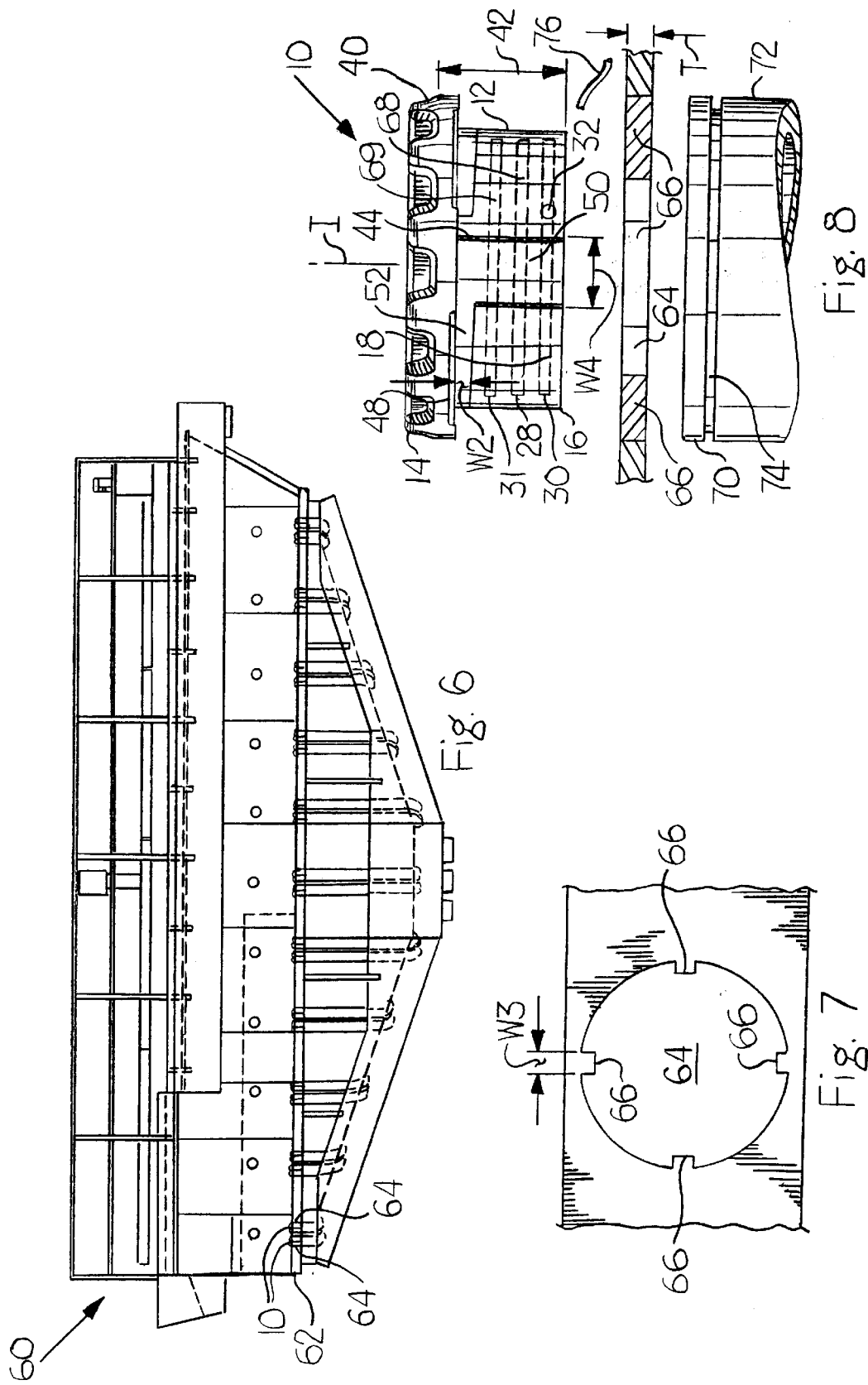

VALVE SEAT

CROSS-REFERENCE TO RELATED APPLICATION

This application claims the benefit of U.S. Provisional Patent Application Serial No. 60/364,698, filed Mar. 15, 2002, entitled "Twist-Lok Valve Seat", herein incorporated by reference in its entirety.

BACKGROUND OF THE INVENTION

1. Field of the Invention

The present invention relates to pipe joints and couplings and, more particularly, to a valve seat for use with a sand classifying tank.

2. Brief Description of the Prior Art

A sand classifying tank is a piece of equipment which receives a sand and water slurry. As particles of sand flow through the sand classifying tank, coarse sand particles settle to a bottom portion of the tank, followed by finer sand particles. By combining sand particles from different sections at the bottom portion of the tank, it is possible to make different classifications of sand.

Sand particles exit a bottom portion of the sand classifying tank through a valve which meters the amount of sand exiting the sand classifying tank. In the past, the valves have been attached to the tank by some sort of fastener, such as bolts or a wedge arrangement. Because the fastener is in contact with the sand and water, the fasteners have a tendency to rust or gall. This often requires that the fasteners be cut from the bottom of the sand classifying tank when the valve is replaced. Moreover, some of the valves are often sealed with silicon or another waterproof sealant, further complicating the installation and removal process.

Therefore, a need exists for an apparatus and method for easily installing and removing a valve from a sand classifying tank.

SUMMARY OF THE INVENTION

The present invention provides a quick way for one person to remove a valve from a sand classifying tank without having to cut a rusted or galled fastener. Furthermore, the present invention provides a fast and easy method of connecting one body to another body via a flexible spline. More particularly, the present invention helps to reduce the amount of time required to replace a pipe connected to the valve seat.

The present invention includes a method to attach a valve seat to a device that is used to separate a solid from a liquid and attach a conduit to the valve seat. The valve seat has an interior surface which defines a first recess and an exterior surface which defines a spline orifice that is in fluid communication with the first recess. The conduit has a first end which defines a spline groove. The preferred method includes the steps of inserting the valve seat into an orifice defined by the device that is used to separate a solid from a liquid and rotating the valve seat in a first direction with respect to the device to removably lock the valve seat in place. Other steps include aligning the first recess defined by the interior surface of the valve seat with the groove defined by the first end of the conduit to form an aligned orifice and inserting a flexible spline through the spline orifice into the aligned orifice. The conduit is removed from the valve seat by removing the flexible spline via the spline orifice. The valve seat is removed from the body by rotating the valve seat in a second direction with respect to the body to unlock the valve seat from the body.

A valve seat according to one embodiment of the present invention may include a hollow body that defines an internal surface and an external surface, wherein the internal surface defines a first recess and a second recess spaced away from the first recess. The external surface defines a spline orifice which extends from the external surface of the hollow body to the second recess. The internal surface may further define a third recess spaced away from the first recess and the second recess and the external surface may define a slot that is configured to receive a tab of the device that separates a solid from a liquid. A first sealing member may be positioned in the first recess and a third sealing member may be positioned in the third recess.

A valve seat according to one embodiment of the present invention may include a hollow body which has a first end, a second end, and defines an internal surface and an external surface. The internal surface may define a throat generally positioned at the first end of the hollow body, a channel generally positioned at the second end of the hollow body and fluidly connected to the throat, an annular ridge positioned at an intersection of the throat and the channel, a first annular recess positioned in the channel between the throat and the second end of the hollow body, and a second annular recess positioned between the first annual recess and the second end of the hollow body. The external surface may define a spline orifice which extends from the external surface of the hollow body to the second annular recess.

The throat may define an annular throat wall and a tapered wall which opens in a direction toward the first end of the hollow body. The taper of the tapered wall may be approximately twenty-one degrees as measured from the annular throat wall. If a taper is included, it is preferred that a first diameter of taper at the first end of the hollow body is greater than a second diameter of the taper at a first intersection of the tapered wall and the annular throat wall. The channel preferably has a larger channel diameter than the first diameter of the annular throat wall, the first annular recess has a recess diameter which is greater than the channel diameter of the channel, and the second annular recess also has a recess diameter which is greater than the channel diameter of the channel.

The external surface has a cap and a cylinder portion, where the cylinder portion defines one or more slots adjacent to the second end of the hollow body. The cap is positioned adjacent to the first end of the hollow body, and the cap defines a plurality of cap tabs which extend away from the cap in a direction toward the second end of the hollow body. A cap seal may be positioned between the cylinder portion of the external surface of the hollow body and the cap tabs defined by the cap.

Each slot generally forms an L-shape defined by a trunk and an arm and the trunk preferably extends from the second end of the hollow body to the cap. The cap further defines a plurality of indentations which act as gripper surfaces to help aid in the installation or removal of the valve seat.

These and other advantages of the present invention will be clarified in the description of the preferred embodiment taken together with the attached drawings in which like reference numerals represent like elements throughout.

BRIEF DESCRIPTION OF THE DRAWINGS

FIG. 6 is a partial cross-sectional side view of a sand classifying tank;

FIG. 7 is a top view of a bottom portion of the sand classifying tank shown in FIG. 6; and FIG. 8 is an exploded view of the valve seat shown in FIGS. 1A and 2–5, the bottom portion of the sand classifying tank shown in FIG. 7, and a pipe.

DETAILED DESCRIPTION OF THE PREFERRED EMBODIMENT

The present invention can be used in any application where a valve is attached to a device and in any application where another object is attached to the valve after the valve has been installed on the device.

Figure 1A:
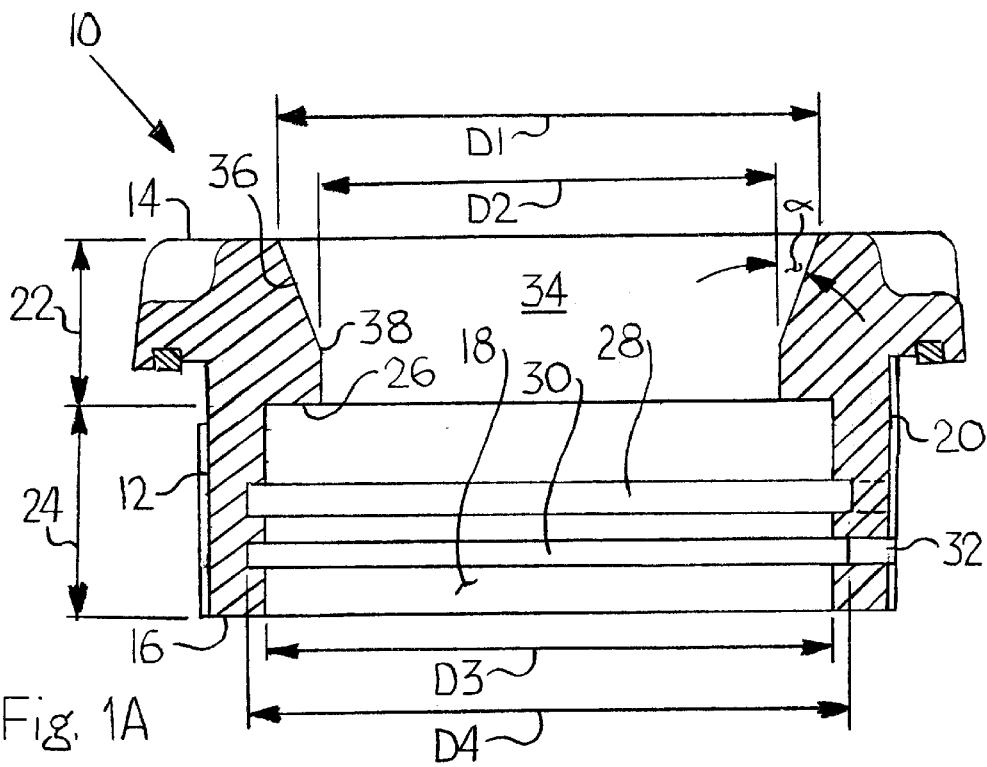
FIG. 1A is a cross-sectional side view of a valve seat according to a first embodiment of the present invention.

FIG. 1A shows a cross-sectional view of a valve seat 10 according to one embodiment of the present invention. The valve seat 10 is preferably injection molded from a polymer or other suitable material. The valve seat 10 preferably has a generally cylindrically-shaped hollow body 12 which has a first end 14, a second end 16, and defines an internal surface 18 and an external surface 20. The internal surface 18 defines a throat 22 generally positioned at the first end 14 of the hollow body 12, a channel 24 generally positioned at the second end 16 of the hollow body 12 and fluidly connected to the throat 22, an annular ridge 26 positioned at an intersection of the throat 22 and the channel 24, a first recess, such as first annular recess 28 positioned in the channel 24 between the throat 22 and the second end 16 of the hollow body 12, and a second recess, such as second annular recess 30 positioned between the first annular recess 28 and the second end 16 of the hollow body 12. A spline orifice 32 extends from the external surface 20 of the hollow body 12 to the second annular recess 30. The first annular recess 28 may receive a sealing member as discussed below.

As shown in detail in FIG. 1A, the throat 22 preferably defines an annular throat wall 34 and a tapered wall 36 which opens in a direction toward the first end 14 of the hollow body 12. A taper α of the tapered wall 36 is approximately twenty-one degrees as measured from the annular throat wall 34, such that a first diameter D1 of taper at the first end 14 of the hollow body 12 is greater than a second diameter D2 of the taper at a first intersection 38 of the tapered wall 36 and the annular throat wall 34.

With continuing reference to FIG. 1A, the channel 24 preferably has a larger channel diameter D3 than the first diameter D1 of the tapered wall 36. In turn, the first annular recess 28 and the second annular recess 30 each have a recess diameter D4 which is greater than the channel diameter D3 of the channel 24.

Figure 1B:
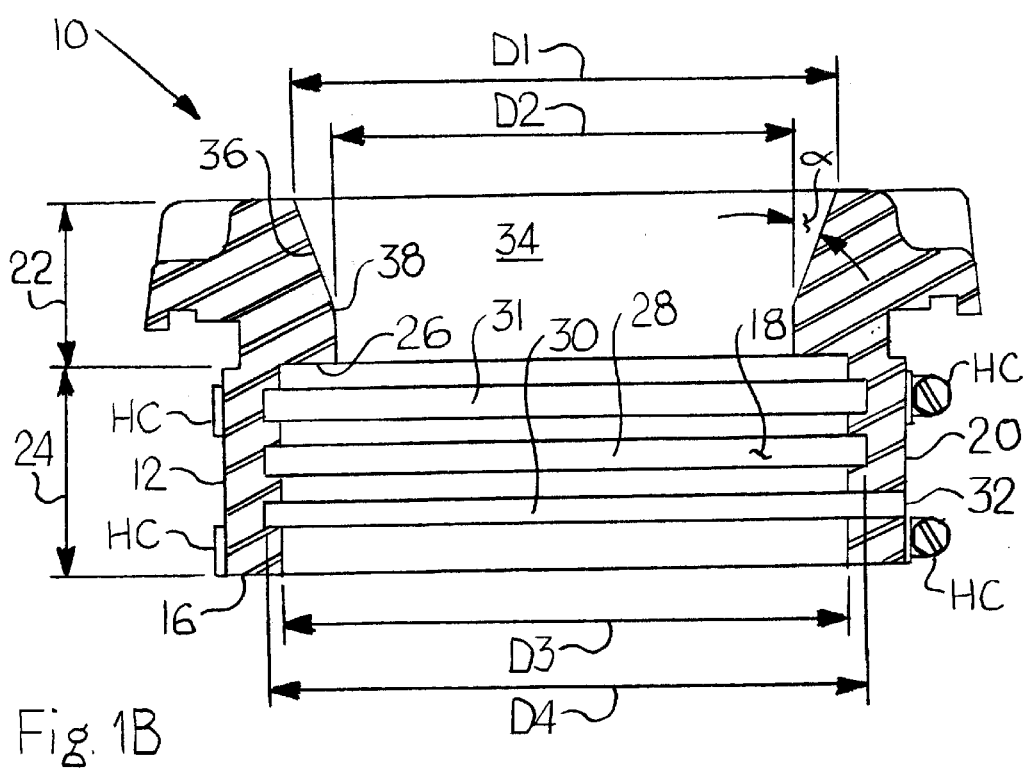
FIG. 1B is a cross-sectional side view of a valve seat according to a second embodiment of the present invention.

FIG. 1B shows a valve seat 10A which is related to the valve seat 10 shown in FIG. 1A, with like reference numeral indicating like parts. However, the valve seat 10A shown in FIG. 1B defines a third annular recess 31 which is preferably identical to the first annular recess 28. The third recess, such as annular recess 31, receives a third sealing member 69 (FIG. 10) as discussed below. The addition of the third annular recess 31 is necessary in some applications where a first sealing member 68 (FIG. 10) is positioned in the first annular recess 28 is pinched or is otherwise compromised during installation of a separate conduit, as discussed below. As also shown in FIG. 1B, one or more standard hose clamps HC may also be provided to help keep the separate conduit connected to the valve seat 10A, or the valve seat 10 shown in FIG. 1A.

Figure 3:
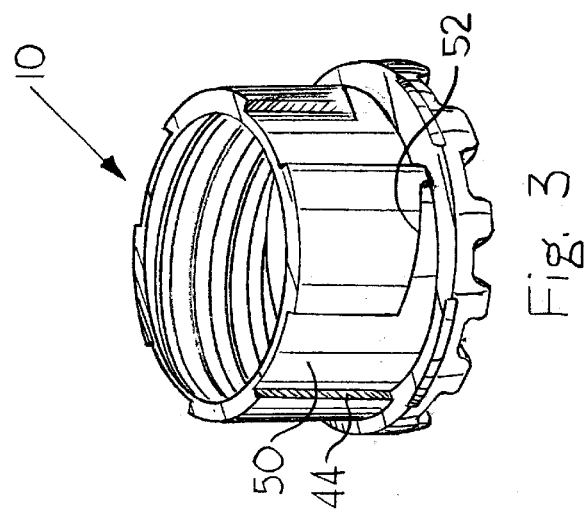
FIG. 3 is a top perspective view of the valve seat shown in FIGS. 1A and 2.
Figure 4:
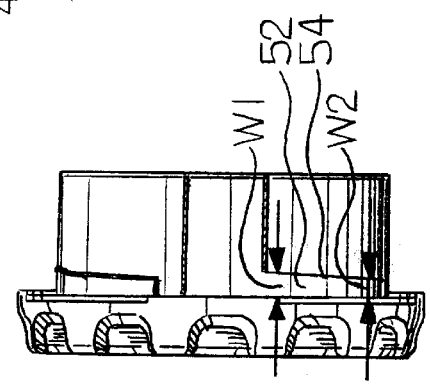
FIG. 4 is another side view of the valve seat shown in FIGS. 1A, 2, and 3.
Figure 2:
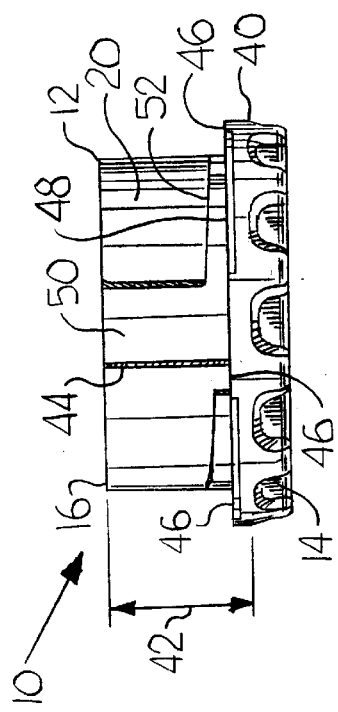
FIG. 2 is a side view of the valve seat shown in FIG. 1A rotated 180 degrees.

FIGS. 2–4 best show the external surface 20 of the hollow body 12 of the valve seats 10 and 10A. As shown in FIG. 2, the external surface 20 has a cap 40 and a cylinder portion 42, where the cylinder portion 42 defines one or more slots 44 adjacent to the second end 16 of the hollow body 12, and the cap 40 is positioned adjacent to the first end 14 of the hollow body 12. The cap 40 defines a plurality of cap tabs 46 which extend away from the cap 40 in a direction toward the second end 16 of the hollow body 12. A cap seal 48, such as an elastomeric O-ring made from rubber, TEFLON or other suitable material, is positioned between the cylinder portion 42 of the external surface 20 of the hollow body 12 and the cap tabs 46 defined by the cap 40. Each slot 44 generally forms an L-shape defined by a trunk 50 and an arm 52. The trunk 50 preferably extends from the second end 16 of the hollow body 12 to the cap 40, but this exact configuration is not required.

As shown in FIGS. 2 and 3, the arm 52 of each slot 44 generally extends away from the trunk 50 in a generally perpendicular direction. As best shown in FIG. 4, the arm 52 has a first width W1 at an intersection of the arm 52 and the trunk 50, and a second width W2 at a terminal point 54 of the arm 52. The functions of the trunk 50, the arm 52, and the first and second widths W1, W2 are discussed below.

Figure 5:
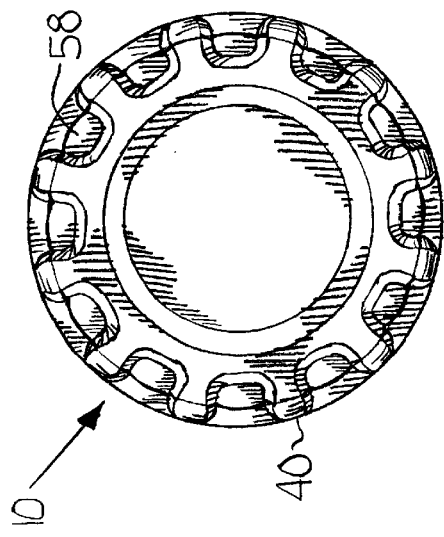
FIG. 5 is a top end view of the valve seat shown in FIGS. 1A and 2.

As shown in FIG. 5, the cap 40 further defines a plurality of indentations 58 which act as gripper surfaces to help aid in the installation or removal of valve seats 10 and 10A.

FIGS. 6–8 generally show a sand classifying tank 60, which is used as a specific example of one type of device that separates solids from a liquid. Other suitable devices which separate solids from a liquid are also clearly contemplated. The arrow in FIG. 6 shows the flow direction of sand and water slurry into the sand classifying tank 60. FIG. 8 shows a sand classifying tank 60 having a bottom portion 62 defining a plurality of orifices 64 which receive a corresponding valve seat 10, 10A according to the present invention. As shown in FIG. 9, each orifice 64 further defines one or more tank tabs 66 which extend toward an imaginary center of each orifice 64. Each tank tab 66 preferably has a tab width W3 less than or equal to a width W4 (FIG. 10) of each trunk 50.

As shown in FIG. 10, each tank tab 66 preferably has a thickness T substantially equal to the second width W2 of each arm 52 of each slot 44. The valve seats 10 or 10A are each fitted with the cap seal 48, discussed above, and a first sealing member, such as first annular sealing member 68, is positioned in the first annular recess 28. In the case of the valve seat 10A shown in FIG. 1B, a third sealing member, such as third annular sealing member 69 (FIG. 10) is also positioned in the third annular recess 31. The addition of a third annular sealing member 69 is optionally required in situations where a conduit has a leading edge which dislodges the first annular sealing member 68 installed in the first annular recess 28 during installation of the pipe 72. The third annular sealing member helps to keep a fluid-tight seal between the pipe 72 and the valve seat 10A.

With continuing reference to FIG. 10, a valve is installed in either of the valve seats 10, 10A through the first end 14 of the hollow body 12. The cylinder portion 42 of the hollow body 12 is then inserted into a corresponding orifice 64 in the bottom portion 62 of the sand classifying tank, such that each tank tab 66 is aligned in a corresponding trunk 50 of each slot 44. The valve seat 10, 10A is then pushed toward the bottom portion 62 of the sand classifying tank 60, with the cap seal 48 providing an elastic force between the cap 40 of the hollow body 12 and the bottom portion 62 of the sand classifying tank 60. Once each tank tab 66 is received in a corresponding trunk 50 and aligned with a corresponding arm 52, the entire valve seat 10, 10A is rotated about the imaginary axis I until each tank tab 66 firmly engages a corresponding arm 52. The engagement, caused in part by the thickness of the tank tabs 66, the gradually narrowing width W2 of each arm 52, and in part by the elastomeric properties of the annular sloped seal 48, keeps the valve seat 10, 10A in place and helps to prevent unwanted reverse rotation of the valve seat 10, 10A once the valve seat 10, 10A is installed. The cap seal 48 also provides a watertight seal between the bottom portion 62 of the sand classifying tank and the valve seat 10, 10A.

Once the valve seat 10. 10A according to either embodiment of the present invention is installed in the bottom portion 62 of the sand classifying tank and a conduit is connected to the valve seat 10, 10A. When the conduit is a cylindrically-shaped pipe 72, a first pipe end 70 of the pipe 72 can be inserted into the internal surface 18 of the hollow body 12 through the second end 16 of the hollow body 12. The first pipe end 70 of the pipe 72 or other conduit defines a groove, such as an annular pipe groove 74. The annular pipe groove is aligned with the second annular recess 30 defined by the internal surface 18 of the hollow body 12 to form an aligned orifice. A flexible spline 76, made from an elastomeric material, such as rubber, TEFLON, or other suitable material, is inserted into the spline orifice 32 defined by the hollow body 12 and is fed into the aligned second annular recess 30 and the pipe groove 74. Once the flexible spline 76 is fed completely through the aligned second annular recess 30 and the pipe groove 74, the valve seat 10, 10A and pipe 72 are removably connected to one another.

Removal of the valve seat 10 is easily accomplished by reverse rotation of the valve seat 10 with respect to the bottom portion 62 of the sand classifying tank 60. Removal of the pipe 72 or other type of conduit is easily accomplished by removing the flexible spline 76 from the aligned second annular recess 30 and the pipe groove 74 and sliding the pipe 72 from the valve seat 10, 10A.

The present invention provides a quick way for one person to remove a valve from a sand classifying tank 60 without having to cut a rusted or galled fastener. Furthermore, the present invention provides a fast and easy method for one person to connect one body to another body via a flexible spline. More particularly, the present invention helps to reduce the amount of time required to replace a pipe connected to a valve seat.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

We claim:

1. A valve seat comprising:
a hollow body that defines an internal surface and an external surface,
wherein the internal surface defines
a first recess; and
a second recess spaced away from the first recess; and;
the external surface defines
a spline orifice which extends from the external surface of the hollow body to the second recess.

2. The valve seat as claimed in claim 1 further comprising a first sealing member positioned in the first recess.

3. The valve seat as claimed in claim 1 wherein the internal surface further defines a third recess spaced away from the first recess and the second recess.

4. The valve seat as claimed in claim 3 further comprising a third sealing member positioned in the third recess.

5. The valve seat as claimed in claim 1 wherein the external surface defines a slot that is configured to receive a tab.

6. The valve seat as claimed in claim 1 wherein the external surface defines a cap.

7. The valve seat as claimed in claim 6 wherein the cap defines an indentation which acts as a gripper surface during installation and removal of the valve seat.

8. The valve seat as claimed in claim 6 further comprising a first sealing member positioned adjacent to the cap.

9. A valve seat comprising:
a hollow body which has a first end, a second end, and defines an internal surface and an external surface,
wherein the internal surface defines:
a throat generally positioned at the first end of the hollow body;
a channel generally positioned at the second end of the hollow body and fluidly connected to the throat;
an annular ridge positioned at an intersection of the throat and the channel;
a first annular recess positioned in the channel between the throat and the second end of the hollow body; and
a second annular recess positioned between the first annual recess and the second end of the hollow body; and
the external surface defines:
a spline orifice which extends from the external surface of the hollow body to the second annular recess.

10. The valve seat as claimed in claim 9, wherein the throat defines an annular throat wall and a tapered wall which opens in a direction toward the first end of the hollow body.

11. The valve seat as claimed in claim 10, wherein a taper of the tapered portion is approximately twenty-one degrees as measured from the annular throat wall, such that a first diameter of taper at the first end of the hollow body is greater than a second diameter of the taper at a first intersection of the tapered wall and the annular throat wall.

12. The valve seat as claimed in claim 9, wherein the channel preferably has a larger channel diameter than a first diameter of the annular throat wall, the first annular recess has a recess diameter which is greater than the channel diameter of the channel and the second annular recess also has a recess diameter which is greater than the channel diameter of the channel.

13. The valve seat as claimed in claim 9, wherein the external surface has a cap and a cylinder portion, where the cylinder portion defines one or more slots adjacent to the second end of the hollow body.

14. The valve seat as claimed in claim 13, wherein the cap is positioned adjacent to the first end of the hollow body and the cap defines a plurality of cap tabs which extend away from the cap in a direction toward the second end of the hollow body.

15. The valve seat as claimed in claim 9, further comprising an annular-shaped seal positioned between the cylinder portion of the external surface of the hollow body and the cap tabs defined by the cap.

16. The valve seat as claimed in claim 13, wherein each slot generally forms an L-shape defined by a trunk and an arm and the trunk preferably extends from the second end of the hollow body to the cap.

17. A method to attach a valve seat to a device used to separate a solid from a liquid and to connect a conduit to the valve seat, wherein the valve seat has an interior surface which defines a recess and an exterior surface which defines a spline orifice that is in fluid communication with the recess, and the conduit has a first end which defines a spline groove, the method comprising the steps of:

a) inserting the valve seat into an orifice defined by the device that separates solids from a liquid; and b) rotating the valve seat in a first direction with respect to the device that separates solids from a liquid to removably lock the valve seat in place.

18. The method as claimed in claim 17, further comprising the steps of:

c) aligning the recess defined by the interior surface of the valve seat with the groove defined by the first end of the conduit to form an aligned recess; and d) inserting a flexible spline through the spline orifice and into the aligned recess.

19. The method as claimed in claim 18, further comprising the step of removing the flexible spline via the spline orifice.

20. The method as claimed in claim 17, further comprising the step of rotating the valve seat in a second direction with respect to the device used to separate a solid from a liquid to unlock the valve seat from the body.

* * * * *

UNITED STATES PATENT AND TRADEMARK OFFICE
CERTIFICATE OF CORRECTION

PATENT NO. : 6,708,952 B2  Page 1 of 1
DATED : March 23, 2004
INVENTOR(S) : Craig F. Brennecke et al.

It is certified that error appears in the above-identified patent and that said Letters Patent is hereby corrected as shown below:

<u>Title page,</u>
Item [57], ABSTRACT,
Line 2, "such as a device, such as a device" should read -- such as a device --.

<u>Column 6,</u>
Line 33, "annual recess" should read -- annular recess --.

Signed and Sealed this

Thirteenth Day of July, 2004

JON W. DUDAS
*Acting Director of the United States Patent and Trademark Office*